(12) United States Patent
Haas et al.

(10) Patent No.: US 7,626,953 B2
(45) Date of Patent: Dec. 1, 2009

(54) COMMUNICATIONS NETWORKS

(75) Inventors: Harald Haas, Bremen (DE); Gordon Povey, Fife (GB)

(73) Assignee: Nokia Corporation, Espoo (FI)

( * ) Notice: Subject to any disclaimer, the term of this patent is extended or adjusted under 35 U.S.C. 154(b) by 1320 days.

(21) Appl. No.: 10/149,797

(22) PCT Filed: Dec. 15, 2000

(86) PCT No.: PCT/EP00/12855

§ 371 (c)(1), (2), (4) Date: Feb. 21, 2003

(87) PCT Pub. No.: WO01/47307

PCT Pub. Date: Jun. 28, 2001

(65) Prior Publication Data

US 2003/0181217 A1 Sep. 25, 2003

(30) Foreign Application Priority Data

Dec. 20, 1999 (GB) .................................. 9930089.9

(51) Int. Cl.
*H04J 3/00* (2006.01)
(52) U.S. Cl. ........................................ 370/280; 370/294
(58) Field of Classification Search ................. 370/276, 370/277, 282, 294, 295, 296, 335, 337, 342, 370/347, 442
See application file for complete search history.

(56) References Cited

U.S. PATENT DOCUMENTS 5,594,720 A  1/1997 Papadopoulos et al. ..... 370/330
6,646,995 B1 * 11/2003 Le Strat et al. ............... 370/252
2003/0185167 A1 * 10/2003 Paneth et al. ................. 370/321
2003/0198247 A1 * 10/2003 Gardner et al. .............. 370/445
2004/0027998 A1 *  2/2004 Palm .......................... 370/276

FOREIGN PATENT DOCUMENTS

EP        0 935 353 A1   8/1999
WO        99 38343 A2    7/1999
WO        WO 99/63686    12/1999

OTHER PUBLICATIONS

T. Chebaro, et al., "*About the CDMA Capacity Derivation*;" In Proceedings of the International Symposium on Signals, Systems, and Electronics, pp. 36-39, Paris, France, Sep. 1-4, 1992.

(Continued)

*Primary Examiner*—Ajit Patel
(74) *Attorney, Agent, or Firm*—Alston & Bird LLP

(57) ABSTRACT

A communications network comprising a plurality of first stations and a plurality of second stations, said first stations being arranged to communicate with the second stations, said first and second stations being arranged so that each of said first and second stations receives signals and transmits signals at different times, wherein at least two of said first stations are arranged to transmit at the same time and to receive at the same time and at least two of said first stations are arranged so that at least one of said first stations transmits and receives at the same time as at least one of the first stations receives and transmits respectively.

50 Claims, 15 Drawing Sheets

OTHER PUBLICATIONS

G. E. Corazza, et al., "*CDMA CellularSsystems Performance with Fading, Shadowing, and Imperfect Power Control*;" IEEE Transactions on Vehicular Technology, 47(2):450-459, May 1998.

K. S. Gilhousen, et al.; "*On the Capacity of a Cellular CDMA System*;" IEEE Transactions on Vehicular Technology, 40(2):303-312, May 1991.

Y. Ishikawa, et al.; "*Method for Evaluating W-CDMA System Capacity Considering Adjacent Channel Interference*;" Electronics Letters, 35(12):968-969, Jun. 1999.

S.M. Shin, et al.; "*Interference-Based Channel Assignment for DD-CDMA Cellular Systems*;" IEEE Transactions on Vehicular Technology, 48(1):233-239, Jan. 1999.

A. Viterbi, et al.; "*Erlang Capacity of a Power Controlled CDMA System*;" IEEE Journal on Selected Areas in Communication, 11(6):892-900, Aug. 1993.

\* cited by examiner

COMMUNICATIONS NETWORKS

FIELD OF THE INVENTION

The present invention relates to a communications network and in particular but not exclusively to a communications network using code division multiple access.

BACKGROUND OF THE INVENTION

Cellular telecommunication networks are known in which the area covered by network is divided into a plurality of cells. Each cell is provided with a base station which is arranged to communicate with mobile stations in the cell associated with the base station. The third generation standards which are currently being discussed propose to use a spread spectrum access technique and in particular the code division multiple access (CDMA) technique.

Code division multiple access is currently being used in the IS-95 standard in the USA.

With the CDMA technique currently being used and proposed, the base stations and mobile stations transmit signals over all of the available frequency range. In order to distinguish the signals, different spreading codes are applied thereto. The spreading codes are generally orthogonal. A mobile station or a base station will therefore receive a relatively large number of signals in the used frequency range. In order to isolate a particular signal, the signals are despread. The particular signal will be isolated in that the desired signal will be much stronger than the undesired signals after despreading with the appropriate code. The undesired signals will provide interference.

The capacity of a CDMA system is dependent on the level of the background interference to a desired signal. If the ratio of the desired signal to the interference does not exceed a certain threshold the quality of the service will be reduced and/or a connection relying on the desired signal may not be established or may be dropped.

In one of the third generation standards (UMTS terrestrial radio access UTRA) proposed, time division duplex (TDD) has been suggested. With TDD, base stations are arranged to transmit and receive at different times. The same is true for mobile stations. A slot structure is suggested.

It has therefore been recognised that it is important to keep the level of interference provided by mobile stations and the base stations to each desired signal to a minimum. Of course, each desired signal acts as interference to other mobile stations or base stations. By maintaining the level of interference to other users to a minimum, the capacity of the system can be increased and/or the quality of service improved.

SUMMARY OF THE INVENTION

It is an aim of embodiments of the invention to improve the capacity and/or quality of service.

According to a first aspect of the invention there is provided a communications network comprising a plurality of first stations and a plurality of second stations, said first stations being arranged to communicate with the second stations, said first and second stations being arranged so that each of said first and second stations receives signals and transmits signals at different times, wherein at least two of said first stations are arranged to transmit at the same time and to receive at the same time and at least two of said first stations are arranged so that at least one of said first stations transmits and receives at the same time as at least one of the first stations receives and transmits respectively.

According to a further aspect of the invention there is provided a method of communicating in a network comprising a plurality of first stations and a plurality of second stations comprising the steps of:
  determining if a first station is to have a first mode in which it transmits and receives signals at the same time as another first station transmits and receives signals respectively or it that first station to have a second mode in which it transmits and receives signals at a different time to the another first station; and
  controlling said first stations to transmit and receive at the same or different times as determined in said determining step.

According to a further aspect of the invention there is provided a network element for use in a network comprising a plurality of first stations and a plurality of second stations, said element comprising means for determining for a second station which is in communication with a first station if that first station is to transmit and receive signals at the same time as another first station transmits and receives signals respectively or if that first station is to transmit and receive signals at a different time to the another first station According to a further aspect of the invention there is provided a communications network comprising a plurality of first stations and a plurality of second stations, said first stations being arranged to communicate with the second stations, the first and second stations being arranged so that each of said first and second station receives and transmits signals at different times, wherein at least two of the first stations are arranged so that there is a predetermined offset between the transmission and/or reception of signals by the at least two first stations.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF EMBODIMENTS OF THE INVENTION

Figure 1:
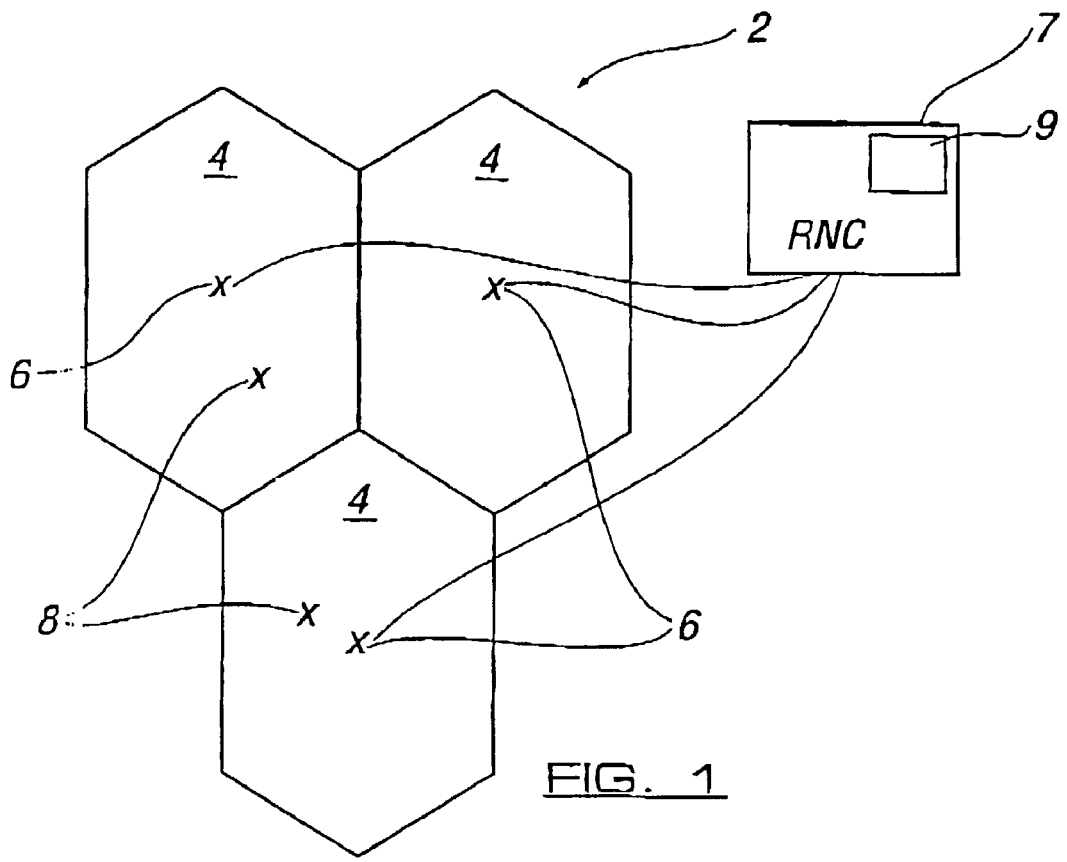
FIG. 1 shows a typical cellular telecommunications network with which embodiments of the present invention can be used.

Reference is made to FIG. 1, which shows a cellular telecommunications network with which embodiments of the present invention can be used. The area covered by the network 2 is divided into a number of cells 4, three of which are shown in FIG. 1. In practice, there will be a much larger number of cells. Each cell is provided with a base transceiver station 6. The base station 6 is arranged to communicate with mobile stations 8 located in the cell associated with the respective base station. Each of the base stations is controlled by a radio network controller 7. In the arrangement shown in FIG. 1, the same radio network controller controls the three shown base stations However, it should be appreciated that more than one radio network controller may be provided in embodiments of the present invention.

The radio network controller has a processor 11 which in preferred embodiments of the present invention are arranged to carry out the method of embodiments of the invention. In order to carry out the embodiments of the present invention, the processor 11 may receive information from the base stations and/or mobile stations.

Embodiments of the present invention are described in the context of a code division multiple access system. In this arrangement, mobile Stations may be arranged to communicate with more than one base station at the same time. This is known as macro diversity and is used in soft handoff. Additionally, the system shown in FIG. 1 is a TDD (time division duplex system). This means that signals for a mobile station from a base station will be received at different times to the transmission of signals from the mobile station to the base station. The same is true for the base station signals received from and transmitted to a mobile station.

In a TDD system, the receive RX and transmission TX slot synchronisation can be defined as the state in which all adjacent base stations (BS) transmit and receive at the same time without any asynchronous overlaps. In other words a first base station and its neighbouring base stations are controlled so that all the base stations transmit at the same time to the respective mobile stations (which may be in their own cell or in a cell associated with another base station). Likewise, the mobile stations in the respective cells are arranged to transmit signals to the base stations at the same time. The base stations are thus synchronised.

Figure 11:
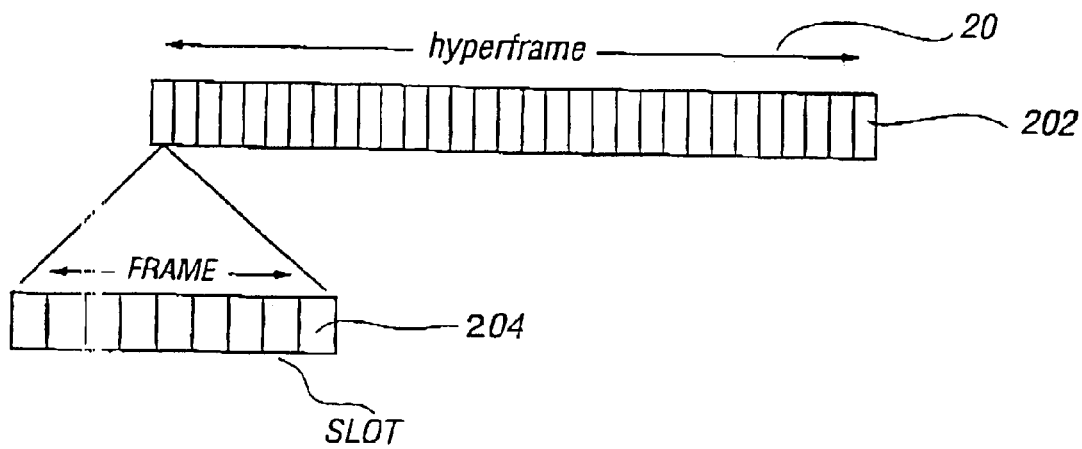
FIG. 11 illustrates the timing structure used in one embodiment of the present invention.

In order to achieve this structure a frame structure such as shown in FIG. 11 is used. A hyperframe 200 is provided which is made up of a number of frame 202, for example 51 or any other suitable number of frames. Each frame, is divided into a number of slots 204, for example 15. Some of the slots will be used by the base station and some of the slots will be used by the mobile station. The number of slots used by the base stations and the mobile stations may be the same or different. TDD is advantageous where there is channel asymmetry. That is where the mobile station and/or the base station have different numbers of receive and transmit slots.

Various different methods have been proposed in order to ensure that the timing of the base stations is controlled by a common time reference. One method uses the GPS system. This technique or any other suitable technique can be used in embodiments of the invention.

If the adjacent base stations do not receive and transmit at the same time, interference at the mobile station comprises interference from other base stations is and mobile stations. Likewise interference at the base station comprises interference from mobile stations and other base stations. Where the base stations are not synchronised a scaling factor a can be defined. This scaling factor a can be defined by the ratio of the frame offset time divided by the slot duration. This provides a measure of the additional interference as compared to the case where there is a synchronisation.

Using a single cell model where the network comprises a cell with one neighbouring cell, it was seen that transmit/receive TX/RX time slot synchronisation does not always yield the highest capacity in an environment with adjacent channel interference It was found by the inventors, that in certain scenarios it is advantageous to oppose time slots between two cells with respect to the TX/RX directions. That is whilst the base station in one cell is transmitting to mobile stations the mobile stations in the other cell are transmitting to the base station. The time slots in the two cells are synchronised.

In order to investigate this further, a more complex model was considered. In this model, dynamic power control was used and a user assignment was based on the minimal path loss. Thus a mobile station was assigned to the base station with which it suffered the minimal; path loss. Furthermore, a cell wrap around technique was applied to ensure that each cell has the same number of neighbours.

Figure 2:
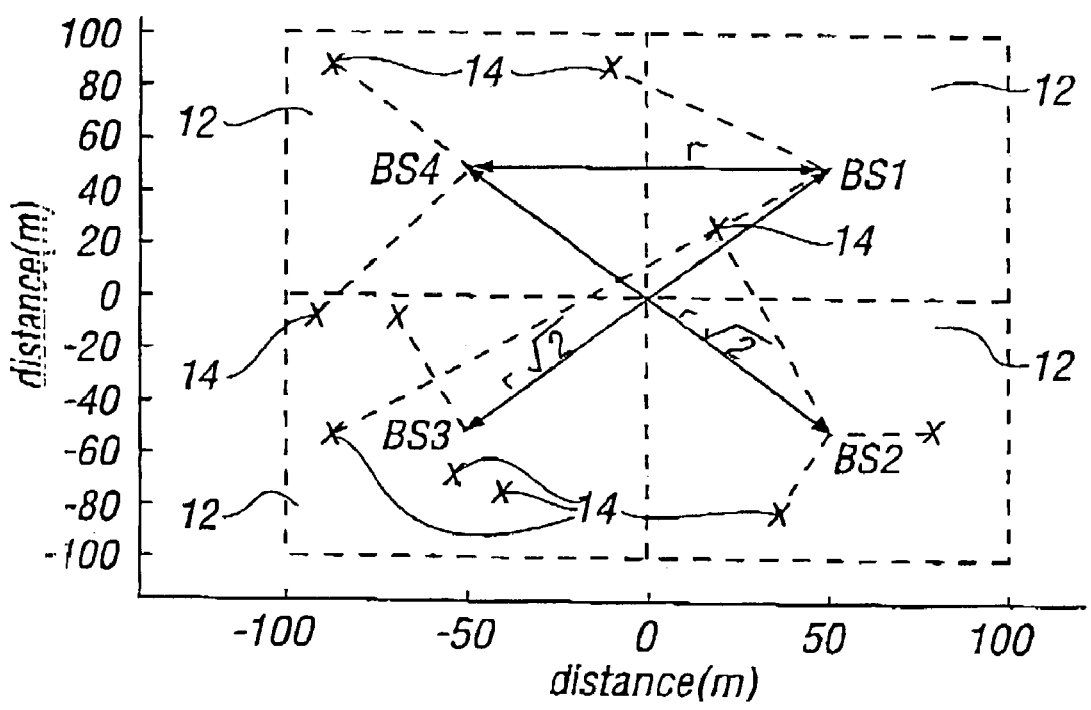
FIG. 2 shows a model of a cellular telecommunications network used to explain embodiments of the invention.

The complex model comprises four cells 12 placed on a quadratic grid as depicted in FIG. 2. In other words each cell is square with a base station 13 in the centre of each cell 12. Each cell 12 has eight neighbour cells (using the wrap around technique) in order to overcome cell boundary effects. The quadratic grid is used since a user assignment based on the minimum path loss is used. Thus, the actual cell layout does not greatly affect the results. The main difference is that the distance between base stations in the more conventional hexagonal grid, as shown in FIG. 1, is constant. In the quandratic grid of the model of FIG. 2, however, the base stations in the cells 12 in the diagonal are separated by $r \sqrt{2}$ with r being the distance between the closest base stations, and the length of the sides of the cells. It should be appreciated that since the path loss is proportional to the logarithm of the distance the results of the quadratic grid are not significantly different to those obtained with the conventional hexagonal grid.

As can be seen from FIG. 2, the path of communication between each mobile station 14 and a base station is indicated in dotted lines. As can be seen, the mobile stations are not always in communication with the base station of the cell in which the mobile station is located. Rather, the mobile station will be in communication with the base station which results in the lowest pathloss.

Figure 3:
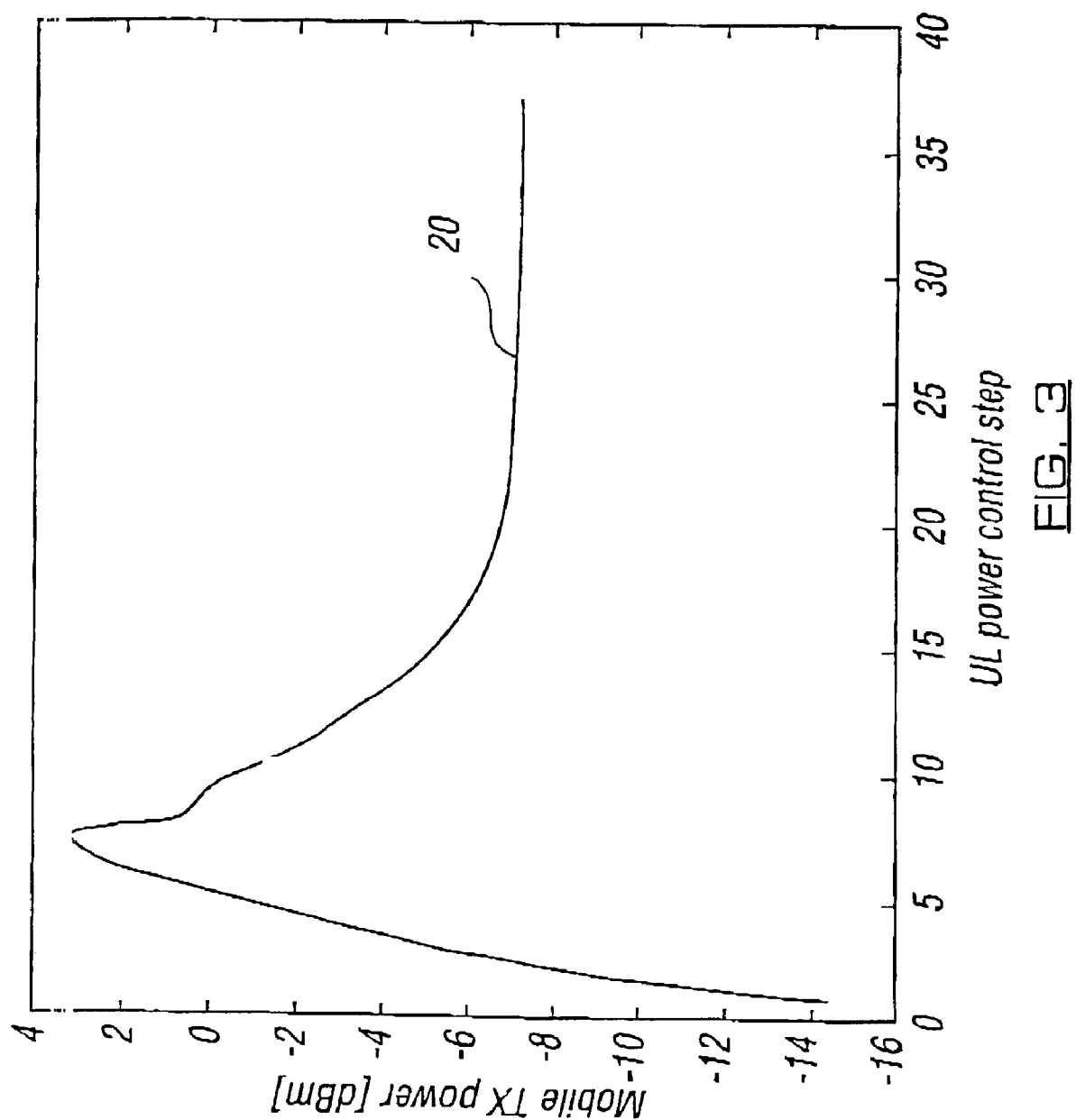
FIG. 3 shows the transmission power of a mobile station.

After a predefined number of users 14 have been distributed randomly and equally in the model, the power control loops in the uplink and downlink are initiated. In FIG. 3, a graph of the power with which a mobile station transmits is plotted against the number of the power control step. In CDMA, the power is controlled to be initially relatively high and is then is reduced as necessary in subsequent power control steps. The power used in usually selected to be relatively high initially to always ensure that the mobile station signals are received by the base station regardless of the distance between the mobile station and the base station. The power control method used may be all open loop power control method or a closed loop power control method.

FIG. 3 thus shows a power control snapshot of a mobile station 14, which was randomly chosen It can be seen that the transmission power rapidly increases. The rapidly increasing transmission power means that the total noise door in the system is high due to the mutual interference effects in a CDMA system. In other words the high transmission power used by the mobile station means that the mobile station provides an increased interference to the other mobile stations. A high noise floor means that the signal to interference ratio is low. Accordingly, some exposed mobiles will not achieve the target desired signal to interference ratio at the base station This can mean that the quality of service is unacceptable or the mobile station is unable to establish a connection with the base station. If a connection has already been made, the connection may be dropped.

The removal of extreme jammers, that is those mobile stations which transmit with a very high power, will result in a reduction of the noise floor until the transmission power converges to a stable power level referenced 20 in FIG. 3.

Embodiments of the present invention provide a method of minimising interference in a TDD system employing a COMA method. The method uses the fact that the interference at any TDD instance is basically composed of two sources. These two sources are interference from base stations and interference from mobile stations. The interference is determined by the degrees of frame synchronisation between neighbouring base stations and also the degree of channel asymmetry of the systems. Thus, by controlling the frame synchronisation between neighbouring base stations means that the interference levels can be controlled, In particular, the total interference can be minimised. In an interference limited system such as a CDMA system, this results in a capacity improvement and/or an increase in the quality of service.

Figure 4:
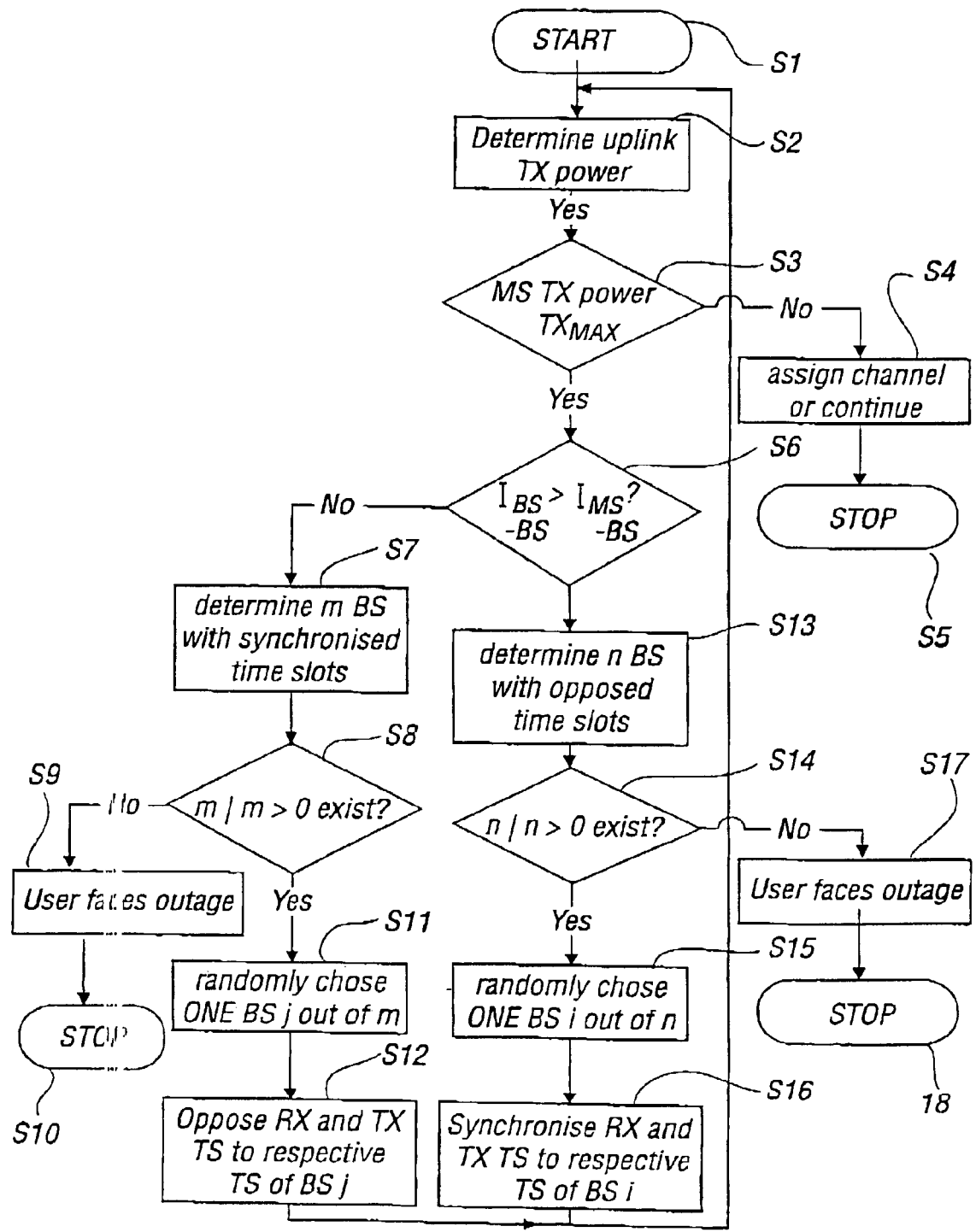
FIG. 4 illustrates one method embodying the present invention.

The method embodying the present invention is schematically shown in FIG. 4 and is arranged only to permit two synchronisation states between neighbouring base stations which are as follows:
 1. ideally synchronised time slots (a=0) where the base stations all transmit at the same time and the mobile transmit at the same time, different from the time at which the base stations transmit,
 2. opposed time slots (a=1) where the base station of one cell transmits at the same time as mobile stations in the adjacent cell and vice versa.

It should be appreciated that a can be any value between 0 and 1 in alternative embodiments. This means that there may be an offset between the frames of adjacent base stations. The tire slots may not start at the same lime in adjacent cells. In other words, one base station will start transmitting or receiving at the beginning of a time slot and a predetermined time later another base station will start transmitting or receiving. This will be before he next slot for the one base station begins.

This method is advantageously applied in an environment with adjacent channels interference since the existence of inter-operator frame synchronisation cannot be assumed. The proposed strategy is incorporated in a dynamic channel algorithm. The method embodying the invention will now be described in more detail with reference to the flow diagram of FIG. 4. The method of FIG. 4 is preferably carried out for each mobile station for each time slot. Alternatively, embodiments of the present invention can be carried out more or less frequently and at regular or irregular intervals.

In the first step S1, the method is started.

In the next step S2, the uplink transmission power of the mobile stations is determined.

In step S3, which follows step S2, it is determined if the determined transmission power is greater than the maximum power with which the mobile station is permitted to transmit. The maximum value is defined in, for example the associated UMTS standard. If the determined transmission power is not greater than the maximum power, the next step is step S4. Otherwise, the next step is step S6.

In step S4 the mobile station is assigned a channel or continues to use the previously assigned channel. In a TDD and CDMA system this means assigning a spreading code and a time slot.

After the mobile station has had a channel assigned thereto, step S5 ends the method.

Step S6 is the next step if it is determined in step S3 that the determined transmission power is greater than the maximum power In- this step, it is determined if the interference at the base station from other base stations is greater than the interference at the base station from the mobile stations.

If the interference from the base stations is not greater than the interference from the mobile stations, then in step S7 it is determined which m base stations have synchronised time slots.

In step S8 it is determined if m|m>0 exists (i.e. is m greater than 0). If this does not exist, then in step S9 the user faces outage. Accordingly in step S10, the method is ended.

If in step S8 it is determined that m|m>0 exists, then the next step is step S11. In step S11, one base station j is randomly chosen out of the m base stations with synchronised time slots.

In step S12, the receive and transmit time slots of base station j are altered to oppose those of base station serving the mobile station under consideration. The next step is then step S2 and the steps are repeated again.

If it is determined in step S8 that the interference from the base stations is greater than the interference from the mobile stations, then the next step is step S13. In step S13 it is determined which n base stations have opposed time slots.

In step S14 it is determined if n|n>0 exists If it does, the next step is step S15 in which one base station i is selected out of the n base stations. In step S16 tine time slots of the base station i are synchronised to the time slots of the base station of interest. The next step is then step S2 and the steps are then repeated.

If n|n>0 does not exist, it is determined in step S17 that the user faces outage. Accordingly in step S18, the method is ended.

The distribution of a predefined number of mobiles was repeated n times with n=5000 and the number of mobiles which experience outage in each Monte Carlo run was stored. Two time slots were considered for each base station (one for transmission and one for reception). The results are shown in FIGS. 5 to 10 and will now be discussed in more detail.

Figure 5:
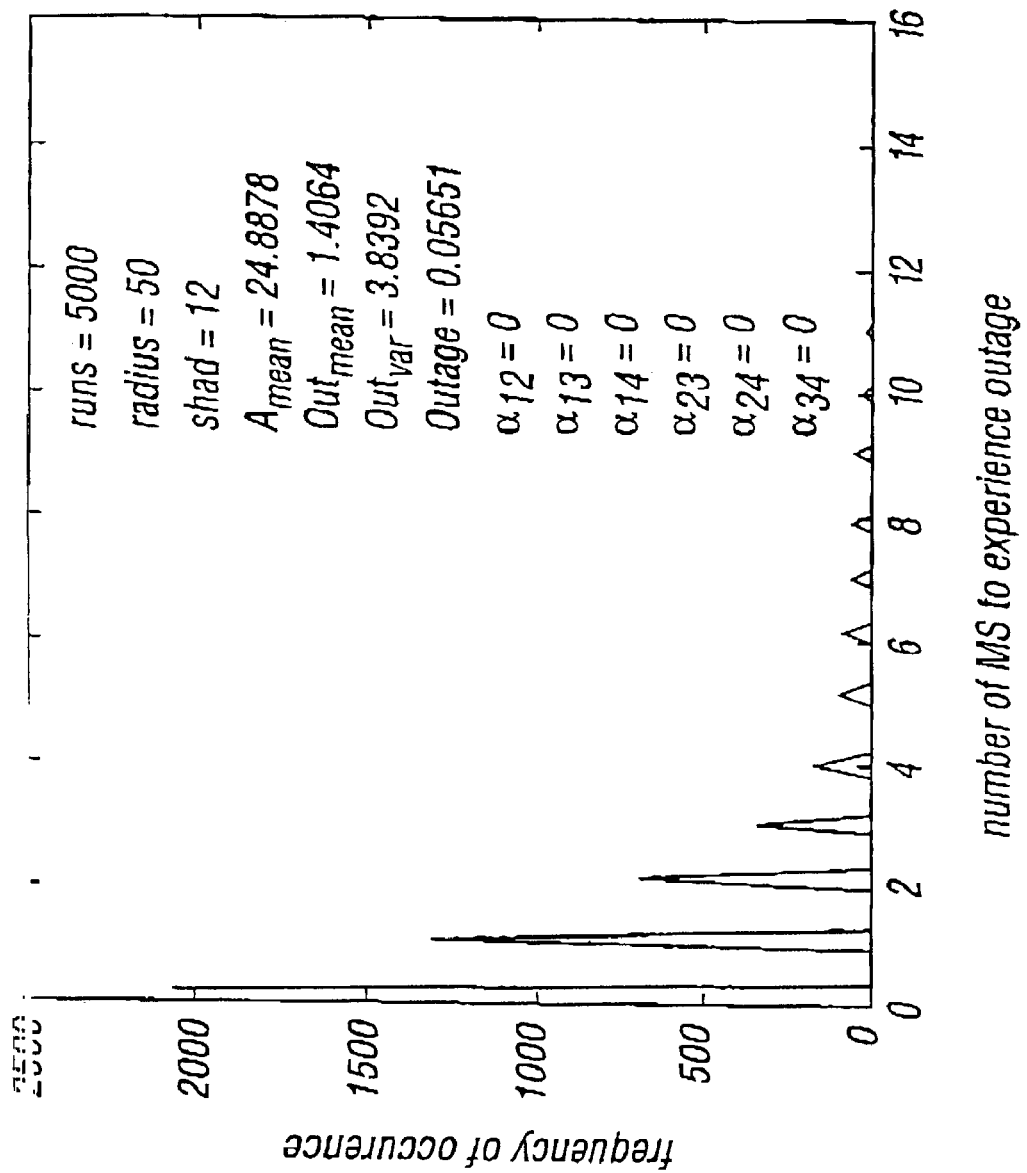
FIG. 5 shows a graph of the frequency of outage occurrences against the number of mobile stations to experience outage for an ideally synchronised network with a first loading.

Reference is made to FIG. 5, which shows a graph of the frequency of outages against the number of mobile stations experiencing an outage. Outage is where the quality of service is reduced below an acceptable level, or where a connection is dropped. FIG. 5 shows the results where the average load A for the entire network is about 24.88, that is an average load per cell and time slot of 6.22 mobiles.

The complete network is ideally synchronised between the TS of interest indicated by $a_{12}, a_{13}, a_{14}, a_{23}, a_{24}, a_{34}=0$ where $a_{12}$ is the transmit and receive synchronisation of the first and second base stations BS1 and BS2 of FIG. 2, $a_{13}$ between the first base station BS1 and the third base station BS3, and so on $a_{xy}=0$ means that the receive and transmit slots of the respective base stations are aligned. Thus both the base stations transmit and receive at the same time. In contrast $a_{xy}=1$ means that the base stations have opposed receive and transmit timing, that is one base station is transmitting while the other base station is receiving.

From FIG. 5, the mean of outage ($Out_{mean}$) can be calculated. Outage is obtained by the following expression:

outage=($Out_{mean}$)/A

From FIG. 5, it can be seen that with an average load A of 6.22 mobiles per time slot, the average load A for the four cells is 24.88. $Out_{mean}$ is 1.41 and outage is about 5.7% assuming ideally synchronised cells (with $a_{xy}=0$).

Figure 6:
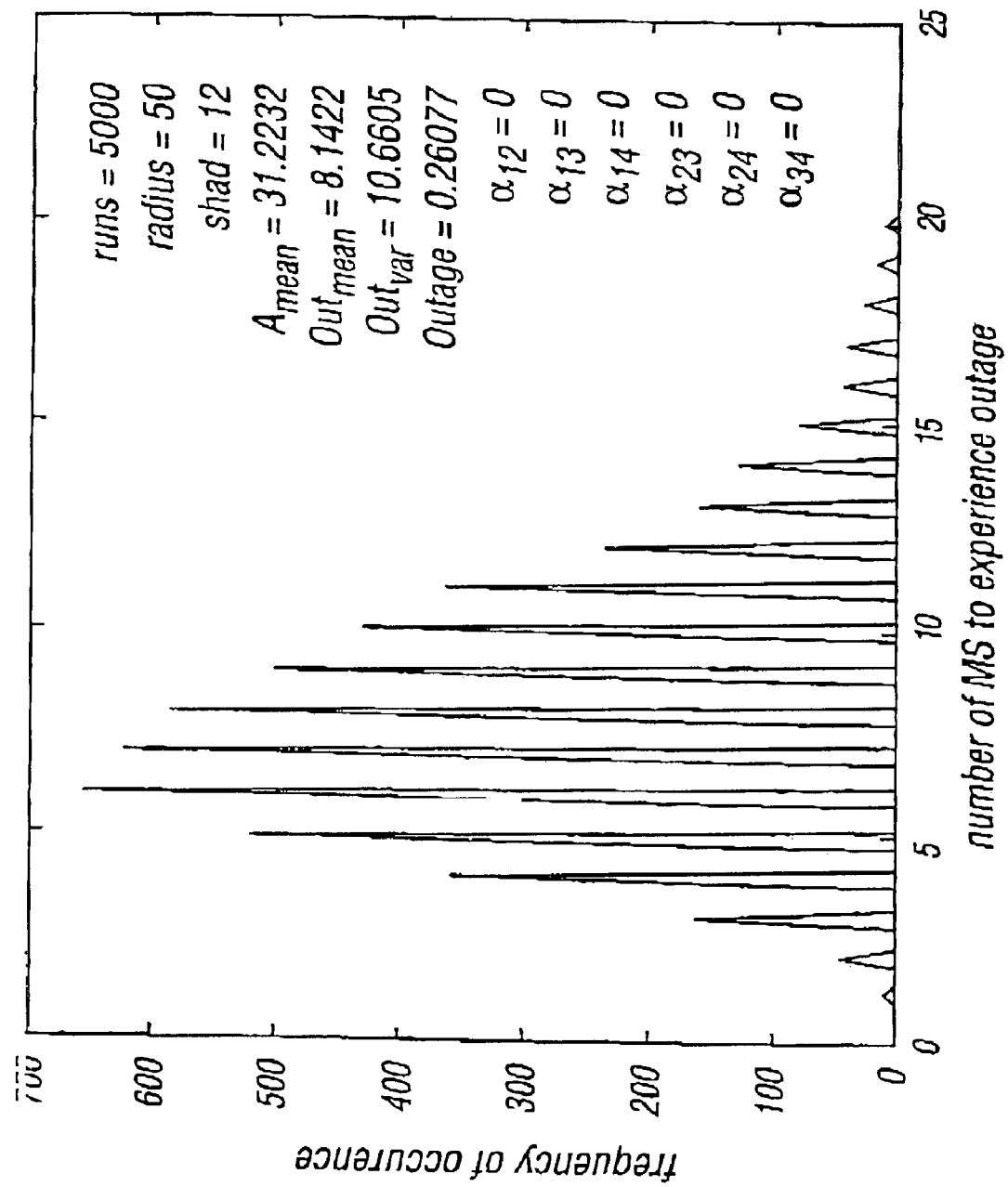
FIG. 6 shows a graph of the frequency of outage occurrences against the number of mobile stations to experience outage for an ideally synchronised network with a second loading.

FIG. 6 shows a similar graph to FIG. 5, but the average load A has been increased to 7.8 users per time slot and cell. In this case outage increases to about 23%. Further simulations with a load of approximately 4 users per time slot and cell were carried out, but show negligible outage.

Figure 7:
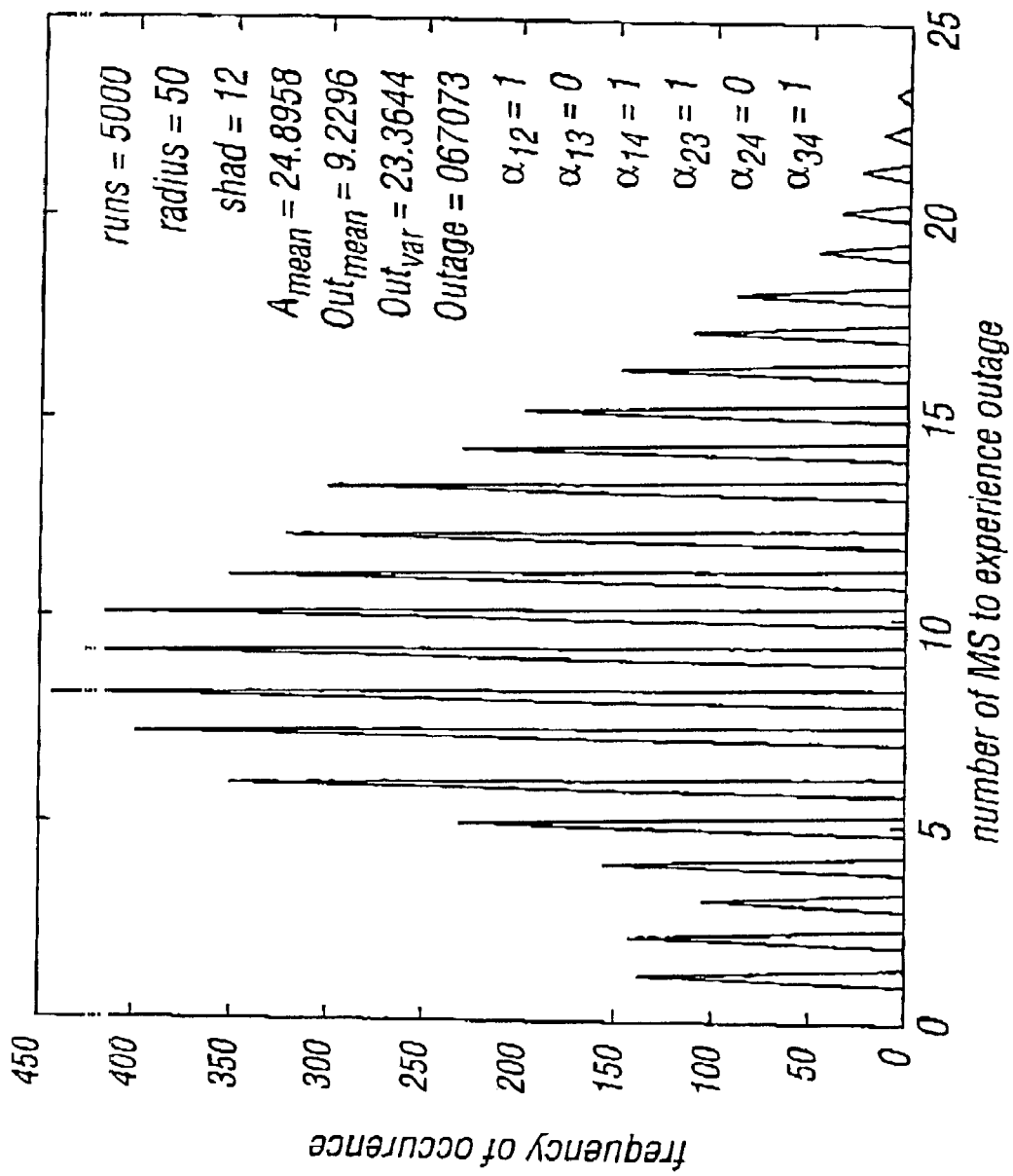
FIG. 7 shows a graph of the frequency of outage occurrences against the number of mobile stations to experience outage for an unsynchronised network with the first loading.

In FIG. 7, shows a similar graph to that of FIG. 5 but the transmit and receive slot synchronisation is assumed to be the worst case. The transmit and receive time slots of the first base station BS1 are opposed to those of the second base station BS2. The transmit and receive slots of the second base station BS2 are opposed to that of third base station BS3. The transmit and receive slots of the third base station BS3 are opposed to those of the fourth base station BS4. This implies that first and third base stations are synchronised and that the second and fourth base stations are synchronised.

In scenario illustrated by FIG. 7, with an average load of 6.22 users per time slot and cell, the outage increases to 37% compared to 5.7% for a perfectly synchronised network.

Figure 8:
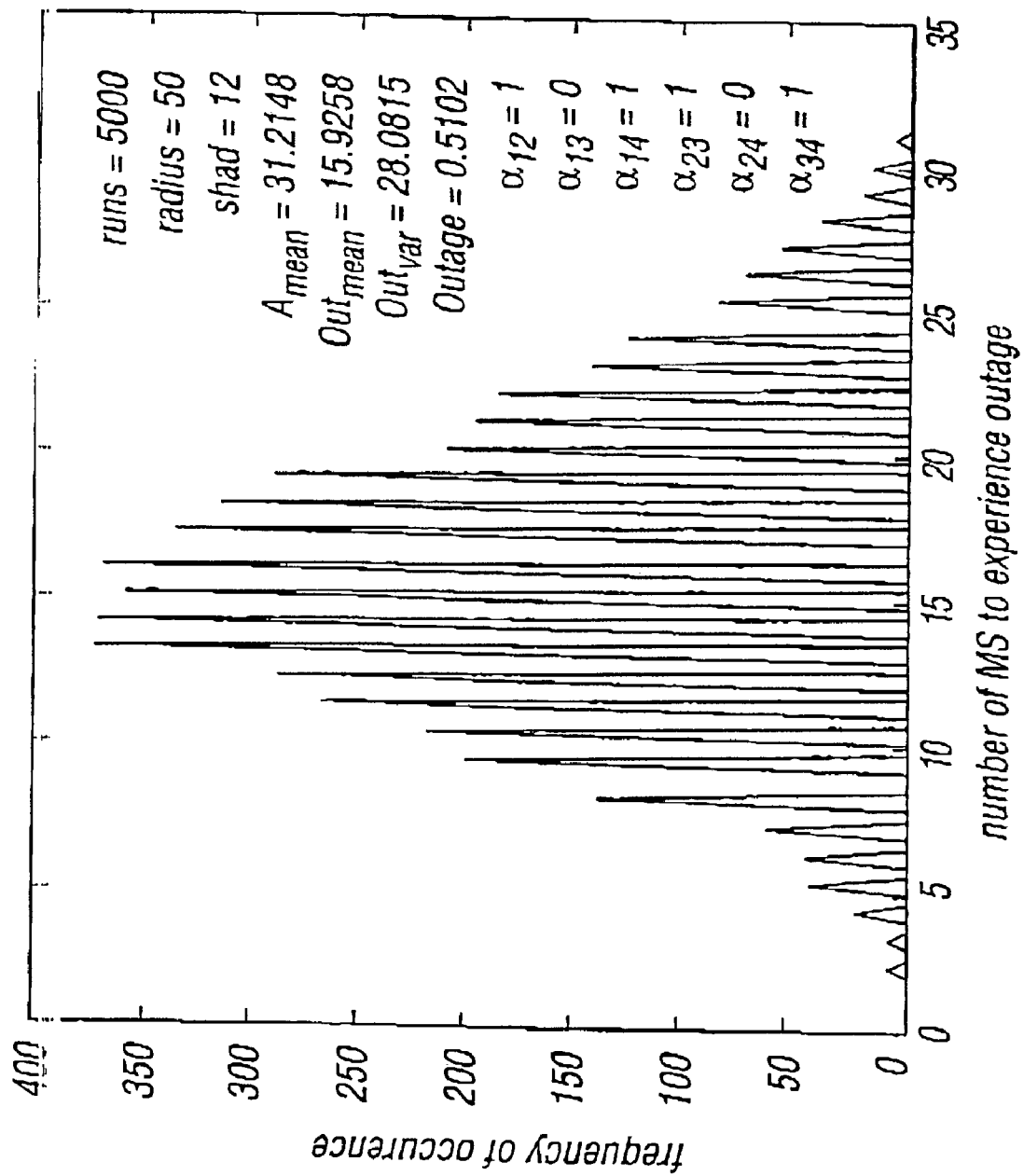
FIG. 8 shows a graph of the frequency of outage occurrences against the number of mobile stations to experience outage for an unsynchronised network with the second loading.

FIG. 8 shows a graph for a similar scenario to that illustrated in FIG. 7 but with an increased load of 7.8 users per time slot and cell. Here the outage rises to 51% compared to 26% in the previous case where the load is 6.22 users per time slot per cell.

Figure 9:
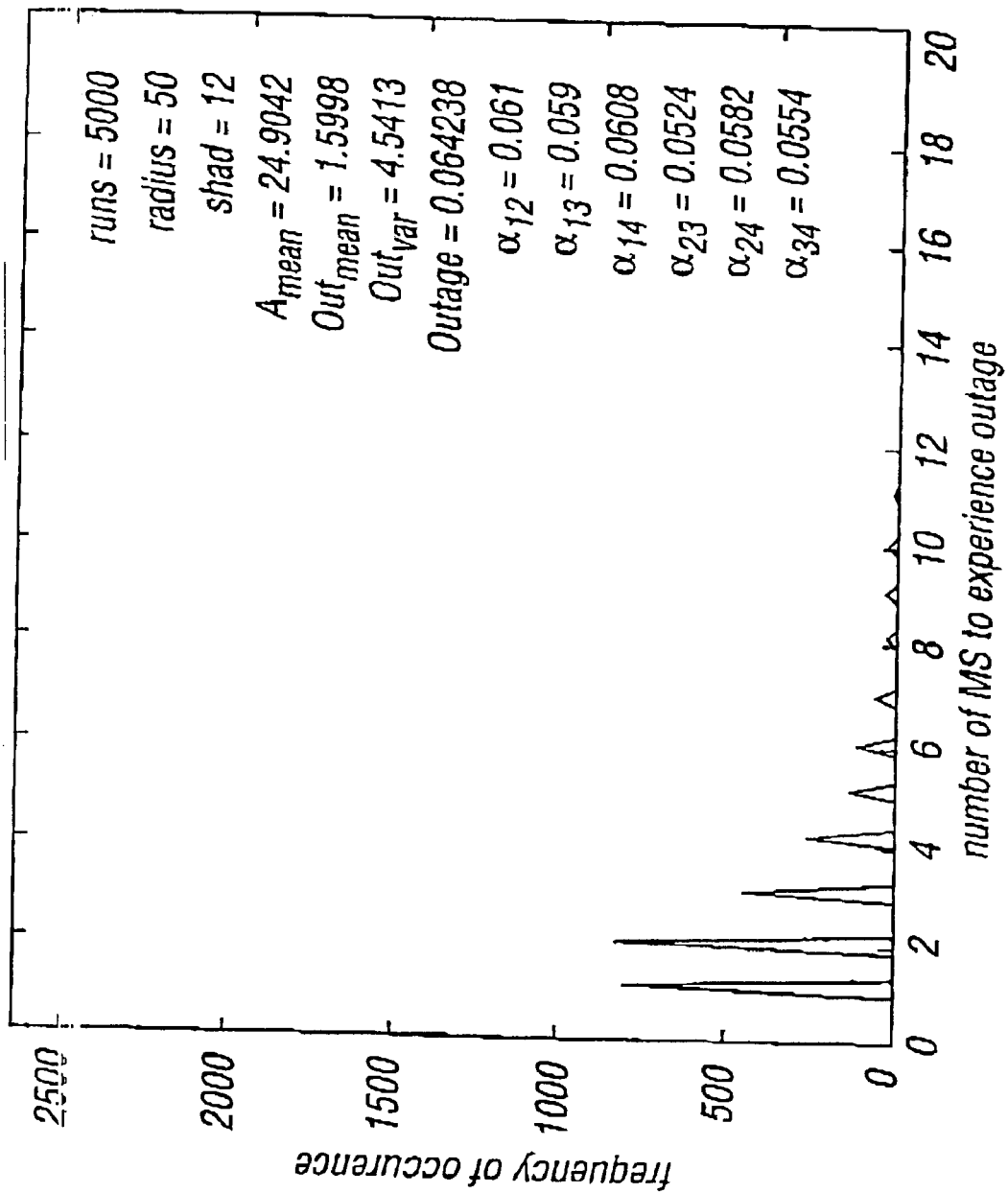
FIG. 9 shows a graph of the frequency of outage occurrences against the number of mobile stations to experience outage for a network operating in accordance with an embodiment of the present invention with the first loading.

FIG. 9 shows a similar graph to that of FIG. 5 but where the method embodying the present invention, as described with reference to FIG. 4, is used. Again, the average load is 6.22 users per time slot per cell. The outage is around 6.4%, which is slightly higher than the value of 5.7% which was found for the ideal case shown in FIG. 5.

In the scenario illustrated in FIG. 9 the following values for a were obtained:
$a_{12}=0.061$
$a_{13}=0.059$
$a_{14}=0.0608$
$a_{23}=0.0524$
$a_{24}=0.0582$
$a_{34}=0.0554$ Accordingly 5.2% to 6.1% of the cases the time slots are opposed to each other which means that one cell is transmitting while the other is receiving.

Figure 10:
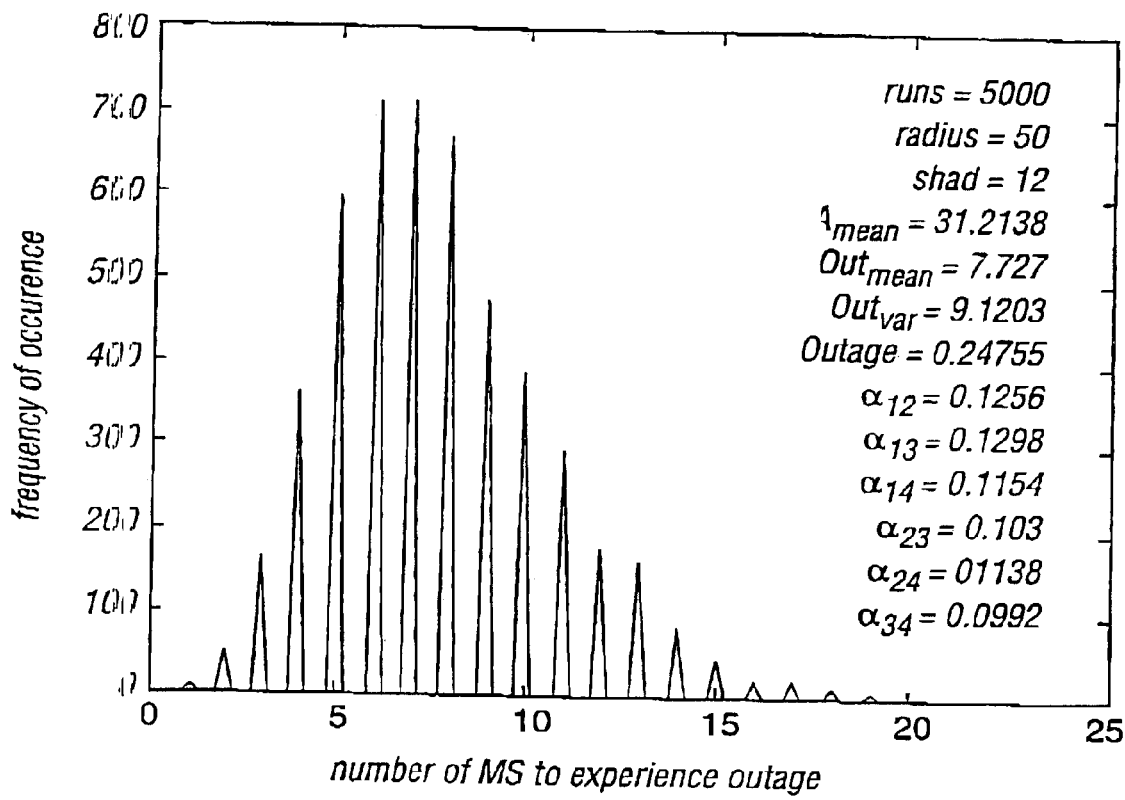
FIG. 10 shows a graph of the frequency of outage occurrences against the number of mobile stations to experience outage for a network operating in accordance with an embodiment of the invention with the second loading.

Reference is now made to FIG. 10 which is similar to FIG. 9 in that it shows, the results of using the method embodying the present invention. However in the case of the graph of FIG. 10, the average load for the four cells has been increased to 31.21 mobiles for the entire network. In this case the outage is slightly lower with a value of 24.76% as compared to the synchronised network shown in FIG. 5 which has a value of 26.08% for the same cell loading.

In the arrangement illustrated in FIG. 10, the following values of a were obtained:
$a_{12}=0.1256$
$a_{13}=0.1298$
$a_{14}=0.1154$
$a_{23}=0.103$
$a_{24}=0.1138$
$a_{34}=0.0992$ Thus in about 10% to 13% of the cases, the time slots are opposed.

In the model used, adjacent channel interference has not been considered. In other words the interference from base and mobile stations controlled by a different operator (or even the same operator) on an adjacent carrier frequency has not been considered. A significant improvement in the presence of adjacent channel interference by applying the method embodying the present invention can be achieved as compared to the current proposals.

It should be appreciated that in order to demonstrate the effectiveness of the invention, the four cell arrangement of FIG. 2 was used. However, it should be appreciated that embodiments of the present invention can be used with any cell layout and the advantages of the present invention can be achieved.

The method embodying the present invention uses the fact that interference at any TDD instance is composed of a mobile station and a base station interference component, the respective contributions of which are dependent on synrchronisation. As discussed previously, a mobile communications network which utilises TDD and CDMA synchronised receive and transmit time slots does not always yield the highest capacity and/or quality of service. Even without the presence of adjacent channel interference the method embodying the present invention is capable of achieving better results than for a perfectly synchronised network.

Embodiments of the present invention are particularly applicable to UTRA/TDD networks. Embodiments of the invention allow an improvement is capacity, performance and/or flexibility of the network. The improvement can be achieved in that the interference to other-users and base stations in the network can be reduced.

The inventors have recognised that the previous assumptions about the asynchronous overlap in a TDD system were not fully correct. As mentioned previously, it has been assumed that the ideal synchronisation provides the best results. Embodiments of the invention cause synchronisation within particular time slots to be opposed rather than the conventional method which proposes that all the local base stations be synchronised to transmit together and to receive together. Using the dynamic channel allocation, the decision on which time slots should be opposed and which should be synchronised can be made intelligently such that the performance of the network is improved. Embodiments of the invention permits different asymmetries to be adopted in adjacent cells while still optimising the capacity.

Figure 16:
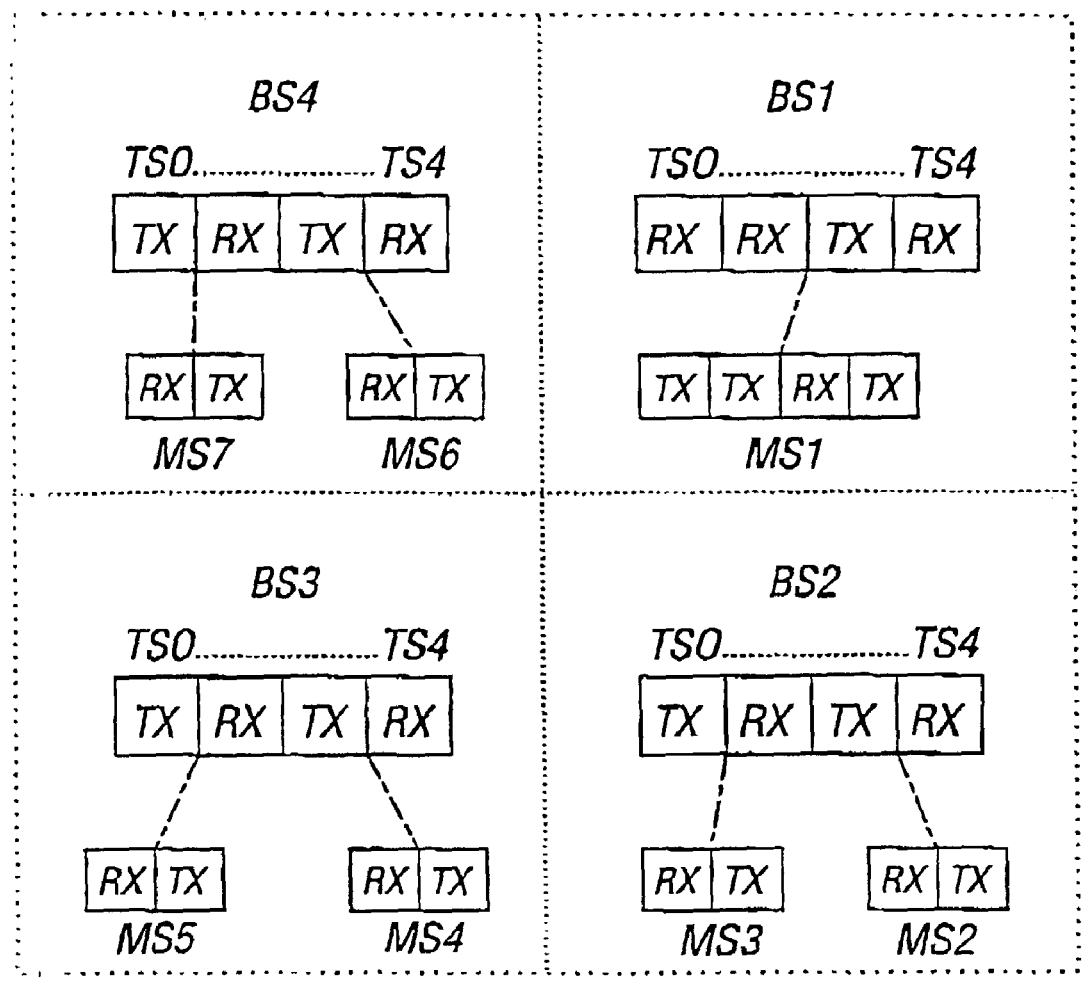
FIG. 16 shows a alternative model.
Figure 17:
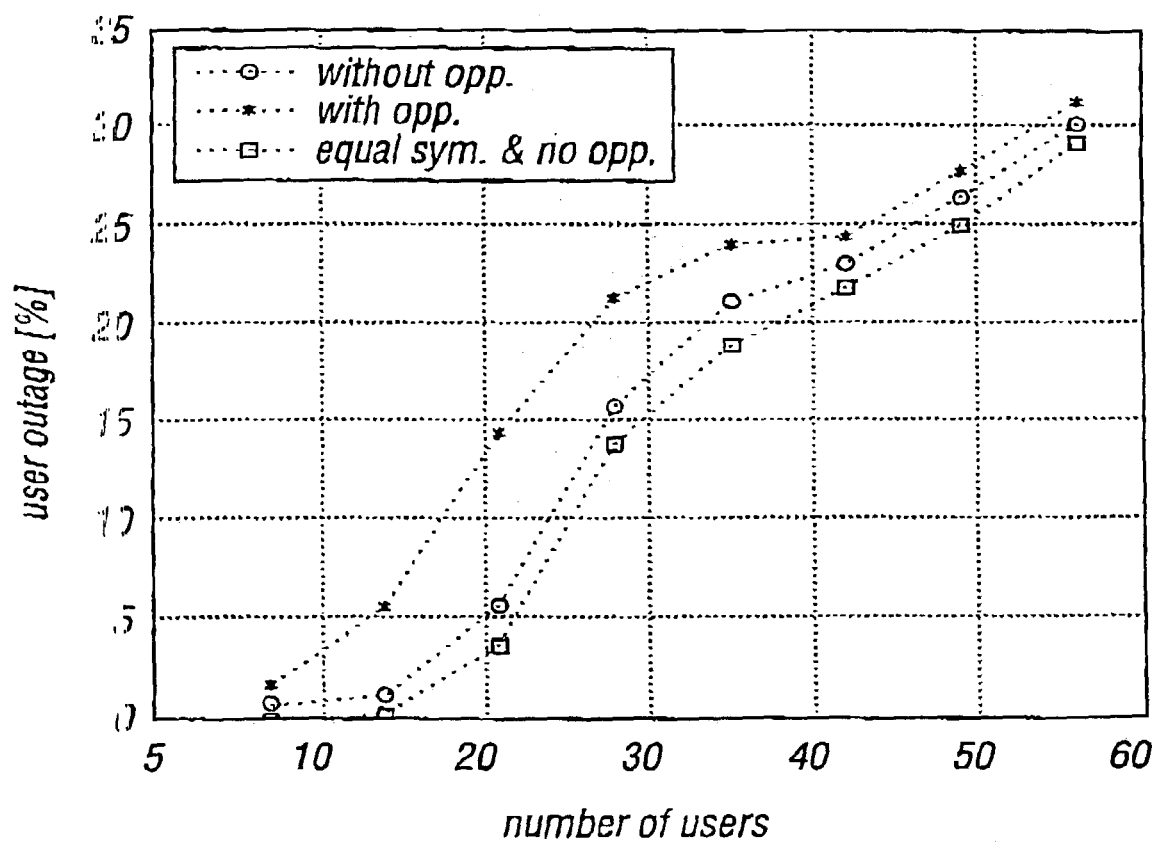
FIG. 17 shows the outage results for the arrangement of FIG. 16.
Figure 18:
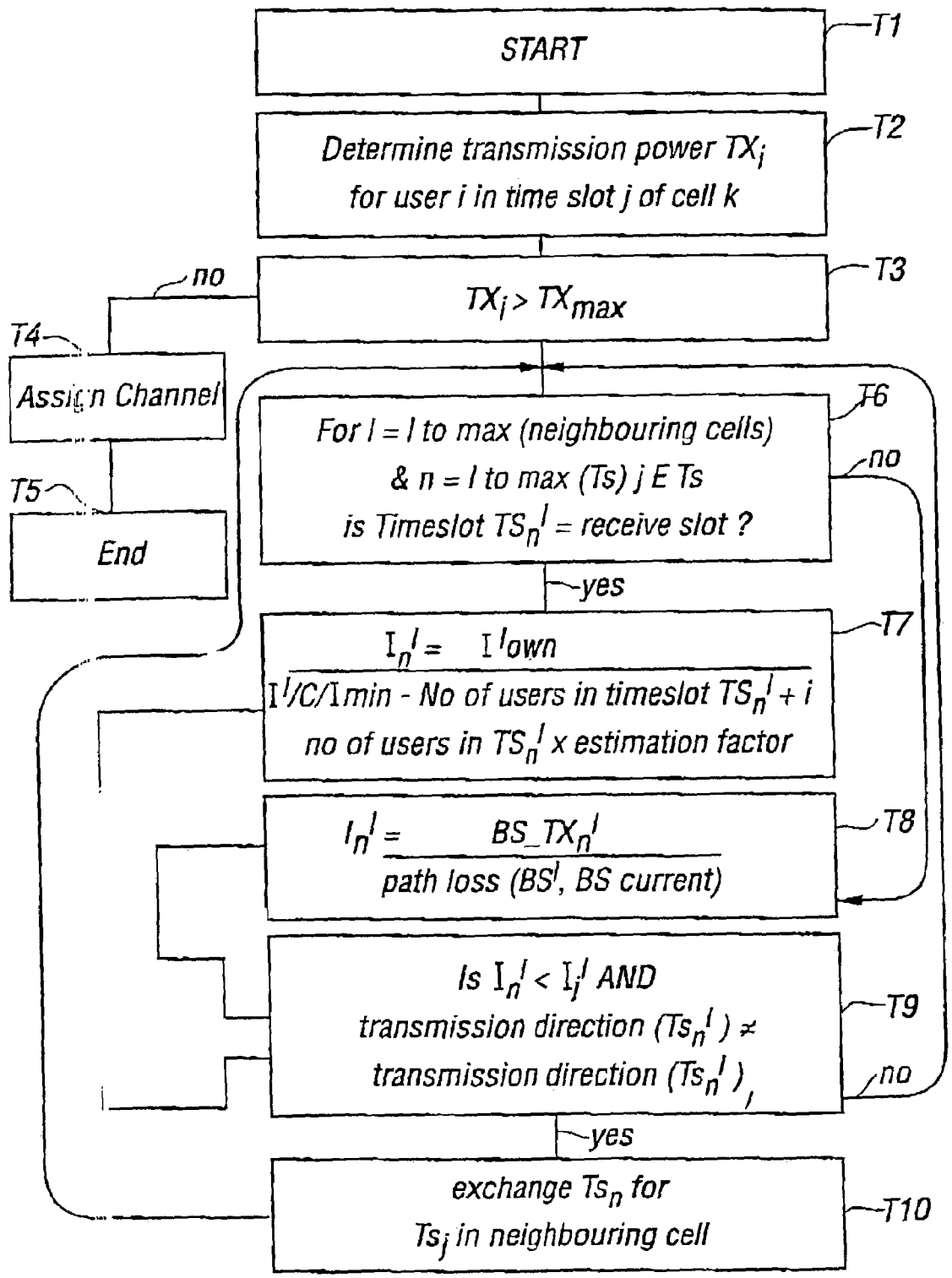
FIG. 18 shows an alternative method embodying the present invention.

Reference is made to FIGS. 14 to 18. The method used in the scenarios illustrated with respect to FIGS. 14 to 17 is as shown in FIG. 18 which shows the steps of an alternative embodiment of the present invention. As with the previous embodiments of the present invention, the method may be part of the channel allocation procedure.

In step T1, the method commences. In step T2, the transmission power TXi is determined for user i in time slot j of cell k. User i is a mobile station.

In step T3, the transmission power determined in step T2 is compared to the maximum permitted transmission power for a mobile station. This value is specified in the appropriate standard.

The next step will be step T4 if the transmission power of the mobile station is not greater than the maximum transmission power. In step T4, a channel is assigned or is continued to be used. The next step, T5, ends the method.

The next step is step T6 if the transmission power TXi is greater than the maximum permitted transmission power. In step T6 it is determined if time slot $TS_{l,n}$ is a receive time slot at the base station where l is one of the neighbouring base stations and n is one of the used time slots j is the time slots for the transmission power of the mobile station is determined.

If the time slot is a receive time slot then the interference $I_{n,l}$ at base station I in time slot n is determined from the following formula $$I_{n,i} = \frac{I_{l,own}}{I_{min}/c - \text{no. of users} + 1} \times \text{no. of users} \times est$$

where est is an estimation factor which can be 1 or above or below 1 and represents the propagation correction. $C/I_{min}$ is the carrier to interference ration in the neighbouring cell I. The no. of users is the number of users in time slot $TS_{n,l}$, $I_{l,own}$ is the interference at the neighbouring base station I from its mobile stations.

If the tine slot is determined in step T6 to be a transmit time slot, the next step is step T8 in which the interference at neighbouring base station I in time slot n, $I_{n,l}$, is determined using the following formula:

$$I_{n,i} = \frac{BS\_TX_{n\_j}}{pathloss\ (BS_i \cdot BS_{current})}$$

where $BS\_TX_{n,l}$ is the transmit power of base station I in time slot n and pathloss($BS_l$, $BS_{current}$) is the pathloss between the current base station and base station I.

The next step after steps T7 and T8 is step T9. In this the value of $I_{n,l}$ determined in step T7 or step T8 is compared with the interference $I_{j,l}$ for the base station I in time slot J. If the former is less than the latter and the transmission direction in time slot n is different to the transmission direction in time slot j, then time slots n and j interchange in step T10. The direction of transmission in time slots j is thus unchanged. The method is then repeated from step T2.

If the former is not less than the latter, the next step is step T6 which repeats the method for a different n and/or i. The method is repeated for all values of n and l and then the method is ended.

Figure 14:
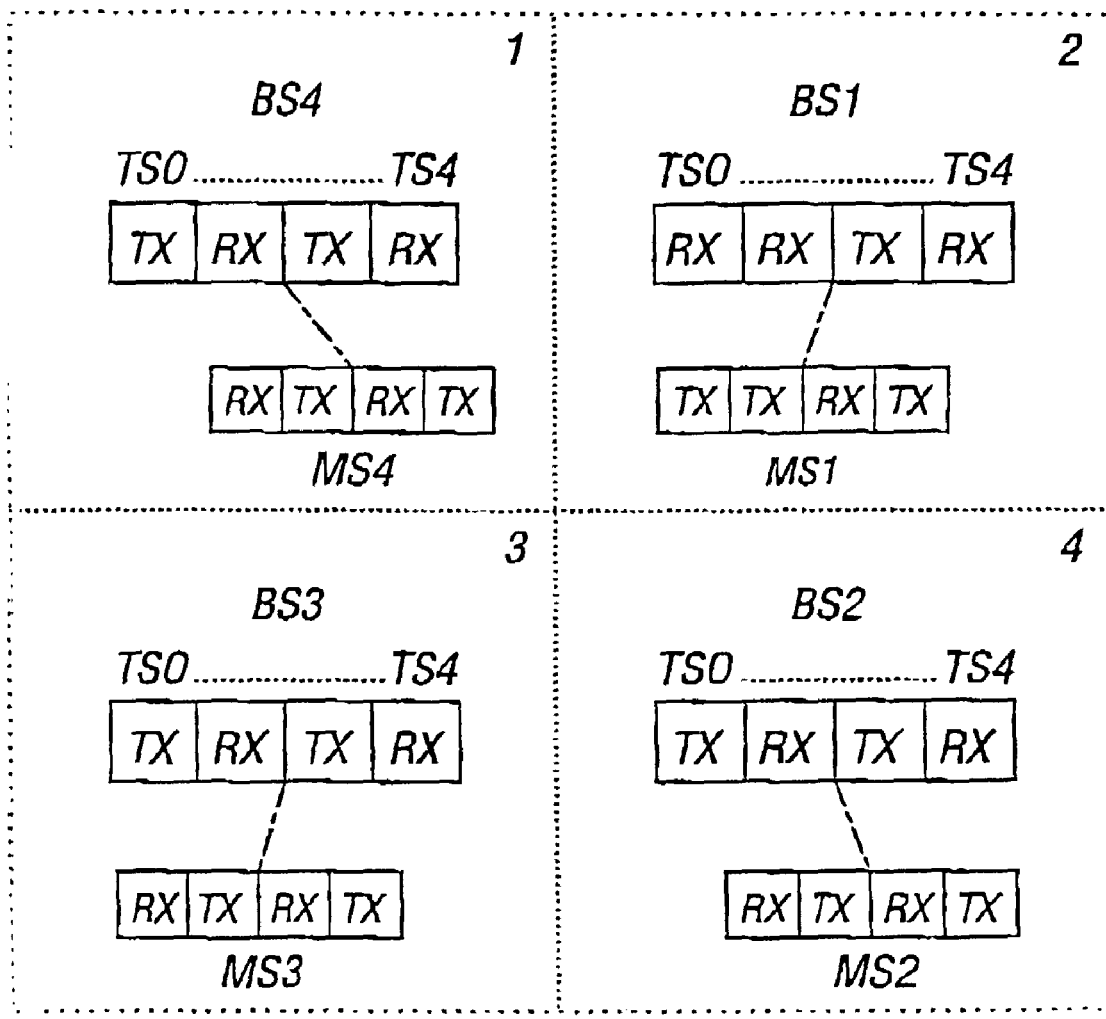
FIG. 14 shows a further cell model.

The scenario as shown in FIG. 14 has four cells 1-4. Each user occupies a set of subsequent time slots and one code. The raw bit rate in each time slot/code is 16 kBit/s, i.e. the service in cells 2 to 4 is a symmetric 32 kBit/s service. In cell 1 the traffic is unbalanced (i.e. the ratio between uplink and downlink is 3:1), 48 kBit/s are transmitted by all mobiles connected to BS1, and only 16 kBits are transmitted by BS1 itself. This scenario causes asymmetric overlaps at time slot TS 1. The resulting outage for different user populations has been investigated. In the model applied, handovers are considered such that not in every case the minimum pathloss applies for the assignment of users to a base station. Each user is assumed to occupy all 4 time slots TS as shown in FIG. 14.

Figure 15:
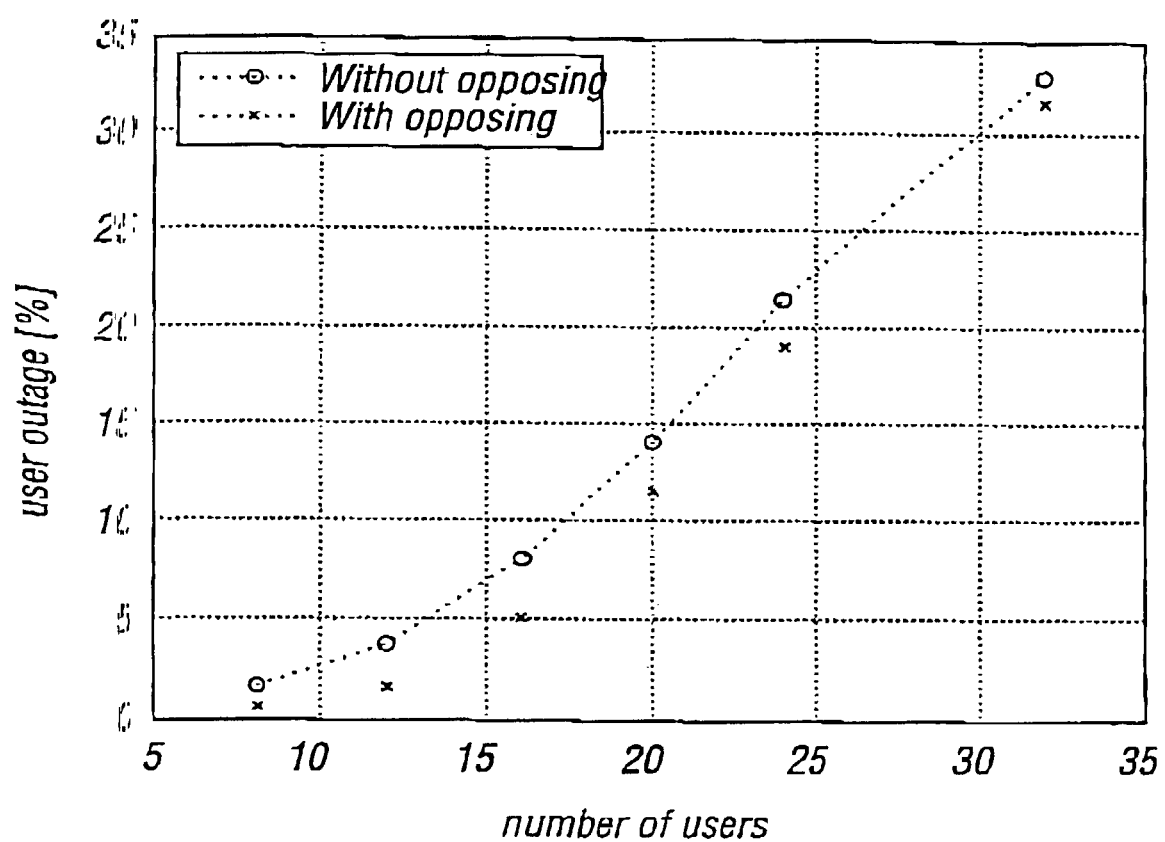
FIG. 15 shows the user outage against the number of users for the model shown in FIG. 14.

The results of this are shown in FIG. 15. The outage figures are shown for the case where the opposing scheme is applied and for the case where no interference resolving algorithm is applied, i.e. the mobiles are assigned randomly and reallocation does not occur. In both cases the model shown in FIG. 14 applies which mean that cell 1 always has a uplink/downlink balance of 3:1.

It can be seen that for a total load of between 12 and 20 users the benefit of the opposing scheme is highest. This is due to the fact that for a network which is not operated at the capacity maximum embodiments of the invention have more options to minimise mutual interference.

For a load of 16 users for example the outage is reduced from about 8% to 5%.

A second scenario is shown in FIG. 16 in contrast to the scenario shown in, FIG. 14, only users of cell 1 occupy 4 subsequent time slots. Again, in cell 1 the uplink/downlink traffic is divided by 3:1, i.e. 48 kBit/s uplink data rate, 16 kBit/s downlink data rate respectively. In contrast to the first scenario A, it is assumed that the service in cells 2 to 4 only require 16 kBit/s Since in cells 2 to 4 a symmetric service is assumed, each user occupies only two subsequent time slots. However, in the simulation four time slots for each cell are considered. This means, that in cells 2 to 4 in total 16 users can be accommodated—assuming maximal 8 users per slot. The assignment procedure in cells 2 to 4 is such that first of all TS1/TS2 are 'filled'. Once TS1/TS2 are operated at their capacity maximum TS3/TS4 are used to assign mobiles.

In FIG. 17, the outage figures are shown for the scenario depicted in FIG. 16. Again, the effects of the opposing algorithm on outage are compared with the case in which no interference resolving algorithm is employed. In addition, the curve marked with squares shows outage for the case, in which no asynchronous overlap exists, i.e. where cell 1 does also employ a symmetric service. In this case TS 1 of BS 1 is also used for transmitting.

Therefore, the curve with the squares can be taken as a reference to study the impact of asymmetric overlaps. It can be seen that the opposing scheme significantly improves outage. The results are very close to the ideal, non-overlapping scenario. For example, lets assume that there are 21 mobiles wanting to have access to the network, for the case of an asymmetric overlap at time slot TS1 and no active interference outage is about 14%. After having introduced the opposing scheme embodying the invention outage is reduced to about 6%, compared to approximately 3.5% for the ideal case.

The outage curves at about 30 to 40 mobiles tend to converge to a stable value before they start rising again. The reason for this effect can be explained by the underlying channel assignment strategy. When considering only tine slots TS1 and TS2 half the capacity maximum is about 32 users. At this threshold users in cells 2 to 4 will be allocated to time slots TS3 and TS4 and will only a few mobiles added to TS3 and TS4 outage will not significantly increase. This behaviour is the same as for 8-20 users where only timeslots TS1 and TS2 of cells 2 to 4 are used to assign mobiles The outage curves reflect these similarities.

In a TD-CDMA which has adapted different cell symmetries the outage due to asymmetric overlaps can be significantly reduced by the method embodying the invention. The greatest advantages may be obtained for a network loading between 30% and 60%. For example, embodiments of the present invention may be used where the network loading is of this level.

To assist in the explanation of the theory behind embodiments of the present invention reference will be made to FIG.

12 which shows a cell of interest (COI) surrounded by a cell (cell 1) having the same receive/transmit assignment from the base station point of view. In contrast, cell 2 employs an opposed receive/transmit assignment with respect to the base station of the cell of interest. The latter scenario is defined as asynchronous cell overlap since it is generated when the two adjacent cells employ different asymmetries. When comparing interference from cell 1 with interference from cell 2, two different interference scenarios exist. When considering the cell of interest and cell 1, only base station to mobile station and mobile station to base station interference needs to be considered. When investigating interference between the cell of interest and cell 2, the interference is base station to base station interference and mobile station to mobile station interference.

The capacity (number of users) for a CDMA system using frequency division duplexing is $$M_{FDD} = \frac{pg(1-\eta)}{E_b/I_o(I+f)} \qquad 1$$

where pg is the processing gain, $\eta = N_0/I_o$ with $N_o$ the thermal noise and $I_o$ the total maximal acceptable interference density, $E_b$ the bit energy and f the ratio of other cell interference to own cell interference at the cell of interest COI.

In the assumptions leading to equation (1) only the mobiles of the adjacent cells contribute to the other cell interference in the uplink since it is an FDD system. Using this model for a TDD system, the factor a, discussed earlier, was introduced to account for the different interference scenarios shown in FIG. 12. Thus, interference from the first tier of adjacent cells can be written in equation 2 as $$I_{other} = \sum_{i=1}^{6} [(1-a_i)I_{MSi} + a_i I_{BSi}] \qquad 2$$

where a=1 if the time slots are opposed and a=0 if the time slots are synchronised.

Substituting equation (2) into equation (1) yields $$M_{TDD} = \frac{pg(1-\eta)}{E_b / I_o \left(1 + \sum_{i=1}^{6} [f_i + a_i(g_i - f_i)]\right)} \qquad 3$$

where $g_i$ is the ratio of other cell interference conveyed by the base station BS i to own cell interference in the cell of interest COI. Similarly, $f_i$ is ratio of the total mobile station MS interference of cell i to own cell interference. $f_i$ is basically the same as observed in an FDD system. Equation 3 reveals an interesting property of a TDD system. It shows that the capacity of a CDMA/TDD system can be higher than in an equivalent FDD system if the receive/transmit direction of two neighbour cells are chosen as with embodiments of the invention which, for example, can be arranged by a simple dynamic channel allocation (DCA) algorithm (see for example FIG. 4). If, or example $g_i$ is smaller than $f_i$ and $a_i$ is chosen such that the time slots asynchronously overlap, hence $a_i$=1, the total other cell interference is smaller than $f_i$ and thus smaller than a similar FDD system would generate. If the capacity results obtained from equation 3 are compared with the results given by equation 1, $$M_{TDD}/M_{FDD} = 1 - \frac{\sum_{i=1}^{6} a_i(g_i - f_i)}{1 + \sum_{i=1}^{6} f_i + a_i(g_i - f_i)} \qquad 4$$

From equation 4 it can be seen that the relative capacity gain in a TDD system compared to an equivalent FDD system can be greater than one if the sum in the nominator is allowed to be smaller than zero.

In preferred embodiments of the invention the following is carried out. A frame duration in UTRA-TOD is 10 ms. One frame is divided into fifteen time slots where each time slot can be allocated to either a downlink or uplink time slot with the only constraint that at least one time slot in any configuration is allocated to the uplink. This allows us to define a simple strategy as follows:

$$a = \begin{cases} 1 & \text{if } g_i < f_i \\ 0 & \text{otherwise} \end{cases} \qquad 5$$

n words, whenever the base station interference contribution from adjacent cell i is smaller than the total mobile station MS interference power from cell i, the algorithm chooses to oppose the respective time slot, i.e. the direction of transmission between two cells at the same time slot is in opposition direction. Thus, the term $a_i (g_i - f_i)$ in equation 4 becomes:

$$\varsigma_i = \begin{cases} 0 & \text{if } g_i \geq f_i \\ g_i - f_i & \text{if } g_i < f \end{cases} \qquad 6$$

This is used by the described methods embodying the invention.

Figure 12:
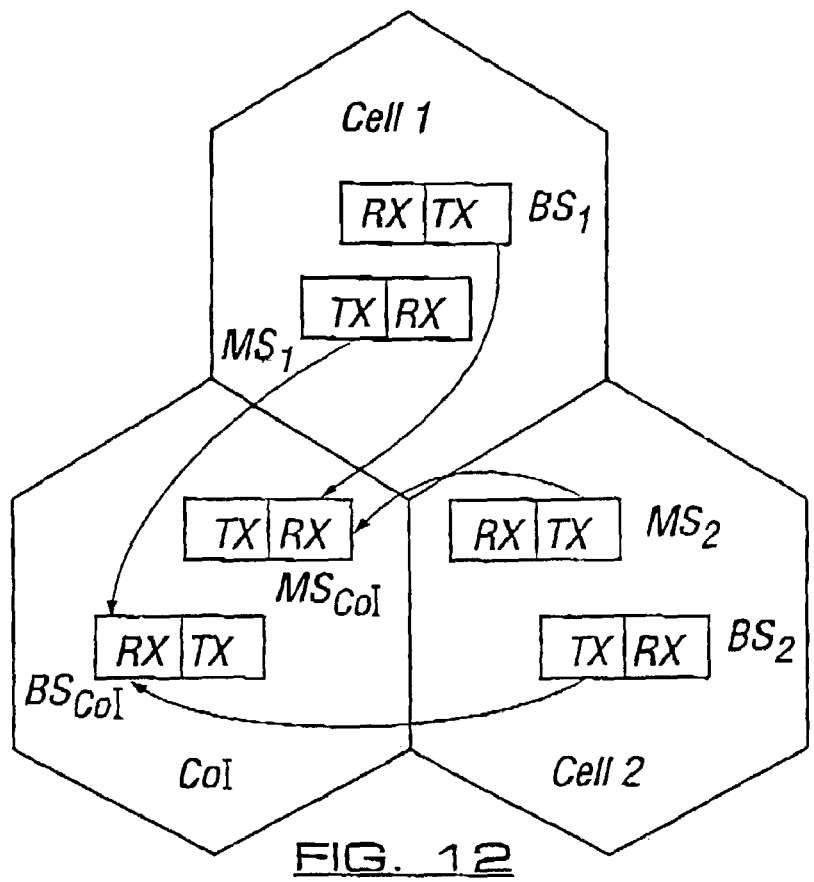
FIG. 12 shows a cell structure for explaining the theory behind embodiments of the present invention.

The cell topology shown in FIG. 12 was used to carry out computer simulations to calculated E{f} and E{ξ}. The cell of interest is surrounded by 6 neighbour cells. In UMTS it is defined that one time slot can accommodate up to 8 users. For the simulation the following parameters were used.

Cell radius=50 m row bit rate=16 kbit/s chip rate=3.84 Mchip/s shadowing=10 dB noise figure=5 max mobile station transmission power=4 dB max base station transmission power=10 dB Eb/lo=2 dB path loss=static COST 231

Figure 13:
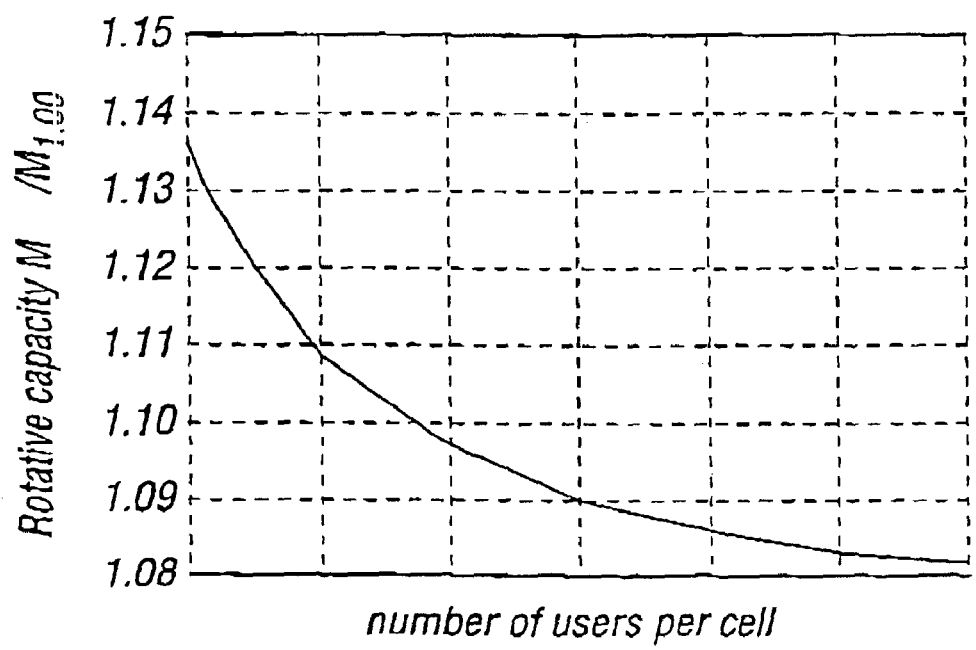
FIG. 13 shows the relative capacity of a TDD cell with respect to an equivalent FDD cell.

The relative capacity in TDD system using the proposed simple method outlined above is depicted in FIG. 13. The number of equally distributed users is varied and drawn or the abscissa. For all user populations investigated the TDD system has higher capacity than the equivalent FDD system The highest capacity gain is about 13,5% for two users per cell. The relative capacity decreases exponentially the more users are distributed into the network. This is because of the non linear increase of own cell interference as the number of users of the network increases..

Embodiments of the present invention are also applicable to interference from adjacent carrier frequencies belonging to different operators or the same operator. This means that different operators may not need to synchronise their networks or adopt the same asymmetry in order to avoid harmful interference.

The preferred embodiments of the present invention have described communications between a mobile station and a base station. The mobile station can be a mobile telephone or any other communication device. It should be appreciated that embodiments of the invention can also be used for the wireless communication with fixed terminals.

Embodiments of the present invention have been described in the context of a code division multiple access technique. However it should be appreciated that embodiments of the present invention can be used with any other suitable techniques, for example other spread spectrum techniques or frequency division techniques including hybrids thereof.

In embodiments of the present invention, the frequency range used for communication from the base station to the mobile station can be the same or different to the frequency range used for communications from the mobile station to the base station.

The method embodying the present invention may be carried out at a radio network controller, base station or the like.

The invention claimed is:

1. A communications network comprising a plurality of first stations and a plurality of second stations, said first stations being arranged to communicate with the second stations, said first and second stations being arranged so that each of said first and second stations receives signals and transmits signals at different times, wherein at least two said first stations are arranged to transmit at the same time and to receive at the same time and at least two of said first stations are arranged so that at least one of first said stations transmits and receives at the same time as at least one of the first stations receives and transmits respectively, and wherein a processor is configured to determine which of said at least two first stations are to transmit and receive at the same time and which of said at least two first stations are to transmit and receive at different times.

2. A communications network as claimed in claim 1, wherein said network is arranged to use a time division duplex method.

3. A communications network as claimed in claim 2, wherein said network arranged to use said time division duplex method is arranged to use a time slot structure wherein respective ones of said first and second stations are arranged to transmit and receive in respective time slots.

4. A communications network as claimed in claim 3, wherein said first and second stations are arranged to use synchronised time slots.

5. A communications network as claimed in claim 1, wherein said network is a wireless telecommunications network.

6. A communications network as claimed in claim 5, wherein said first stations are base stations.

7. A communications network as claimed in claim 5, wherein said second stations are mobile stations.

8. A communications network as claimed in claim 1, wherein said network has a loading of between 30 and 60% of the maximum loading.

9. A network as claimed in claim 1, wherein between 5 and 20% of the network is arranged so that at least one first station transmits and receives at the same time as at least one of the first stations receives and transmits.

10. A communications network as claimed in claim 1, wherein at least one of said first stations is arranged to transmit to or receive from an associated second station more than the associated station is arranged to transmit to or receive from the at least one first station.

11. A communications network as claimed in claim 1, wherein said determining means are provided in at least one of said first stations.

12. A communications network as claimed in claim 1, wherein said determining means are provided in a further network element.

13. A communications network as claimed in claim 12, wherein said determining means are provided in a network controller.

14. A communications network as claimed in claim 1, wherein said determining means is arranged to determine the transmission power of one or more of said first and/or second stations to determine if the two first stations are to transmit and receive at the same or different times.

15. A communications network as claimed in claim 1, wherein said determining means is arranged to determine the interference caused by said first and/or said second stations to determine if the two first stations are to transmit and receive at the same or different times.

16. A communications network as claimed in claim 1, wherein said network is a code division multiple access network.

17. A method of communicating in a network comprising a plurality of first stations and a plurality of second stations comprising:
   providing a plurality of first stations and a plurality of second stations, the first stations being arranged to communicate with the second stations; said first and second stations being arranged so that each of said first and second stations receive signals and transmit signals at different times;
   determining if a first station is to have a first mode in which it transmits and receives signals at the same time as another first station receives and transmits signals respectively or if that first station to have a second mode in which it transmits and receives signals at a different time to the another first station; and
   controlling said first station to transmit and receive at the same or different times as determined in said determining.

18. A method as claimed in claim 17, wherein said method comprises determining for second station which is in communication with said that first station; the power with which said second station is transmitting, the transmission power being used to determine if that first station is to have the first mode or the second mode.

19. A method as claimed in claim 18, wherein said determined power is compared to a predetermined maximum power.

20. A method as claimed in claim 19, wherein if said predetermined power is greater than the determined power, said second station and said first station communicate.

21. A method as claimed in claim 17, comprising determining interference, said interference being used to determine if said first or said second mode is to be used by that first station.

22. A method as claimed in claim 21, wherein the interference from at least one other first station is determined.

23. A method as claimed in claim 21, wherein the interference from at least one second station is determined.

24. A method claimed in claim 22, wherein said interference from at least one other first station is compared with the interference from at least one second station.

25. A method as claimed in claim 24, wherein if the interference from at least one other first station is greater than the interference from at least one second station, then that first station is arranged to transmit and receive at the same time as the another first station.

26. A method as claimed in claim 24, wherein if the interference from at least one other first station is less than the interference from at least one second station then that first station is arranged to transmit and receive at different times to the another first station.

27. An apparatus comprising a processor configured to determine for a first station between transmitting and receiving signals at the same respective times as another first station and transmitting and receiving signals at different respective times to the another first station; wherein the processor is further configured to determine for a second station which is in communication with said the first station, the power with which said second station is transmitting, the transmission power being used to determine if the first station is to transmit and receive signals at the same respective times as the another first station or transmit and receive signals at different respective times to the another first station.

28. A communications network comprising a plurality of first stations and a plurality of second stations, said first stations being arranged to communicate with the second stations, the first and second stations being arranged so that each of the said first and second stations receives and transmits signals at different times, wherein at least two of the first stations are arranged so that there is a predetermined offset between the transmission and/or reception of signals by the at least two first stations, and wherein means are provided for determining which of at least two of the first stations are arranged so that there is a predetermined offset between the transmission and/or reception of the signals by at least two first stations.

29. A communication network as claimed in claim 28, wherein said transmission by one of said first stations occurs at the same time that the other first station receives signals.

30. A communication network as claimed in claim 28, wherein said transmission by one of said first stations occurs at the same time that the other first station transmits signals.

31. A communications network comprising a plurality of first stations and a plurality of second stations, said first stations being arranged to communicate with the second stations, said first and second stations being arranged so that each of said first and second stations receives signals and transmits signals at different times, wherein at least two said first stations are arranged to transmit at the same time and to receive at the same time and at least two of said first stations are arranged so that at least one of first said stations transmits and receives at the same time as at least one of the first stations receives and transmits respectively, and wherein means are provided to determine which of said at least two first stations are to transmit and receive at the same time and which of said at least two first stations are to transmit and receive at different times.

32. A method as claimed in claim 20, comprising the step of determining interference, said interference being used to determine if said first or said second mode is to be used by that first station.

33. A method as claimed in claim 32, wherein if said predetermined power is less than the determined power, then the interference is taken into account when determining the mode of that first station.

34. An apparatus as claimed in claim 27, wherein said determined power is compared to a predetermined maximum power.

35. An apparatus as claimed in claim 34, wherein if said predetermined power is greater than the determined power, said second station and said first station communicate.

36. An apparatus as claimed in claim 27, wherein the processor is configured to determine interference of the signals transmitted and received by the first station, said interference being used to determine if the first station is to transmit and receive signals at the same respective times as the another first station or transmit and receive signals at different respective times to the another first station.

37. An apparatus as claimed in claim 36, wherein the processor is configured to determine the interference between the another first station and the first station.

38. An apparatus as claimed in claim 36, wherein the processor is configured to determine the interference between the second station and the first station.

39. An apparatus claimed in claim 36, wherein the processor is configured to compare the interference between the another first station and the first station with the interference between the second station and the first station.

40. An apparatus as claimed in claim 39, wherein the processor is configured to instruct the first station to transmit and receive at the same time as the another first station if the interference between the another first station and the first station is greater than the interference between the second station and the first station.

41. An apparatus as claimed in claim 39, wherein the processor is configured to instruct the first station to transmit and receive at different times to the another first station if the interference between the another first station and the first station is less than the interference between the second station and the first station.

42. A method comprising determining for a first station between transmitting and receiving signals at the same respective times as another first station and transmitting and receiving signals at different respective times to the another first station; wherein the method further comprises determining for a second station which is in communication with said the first station; the power with which said second station is transmitting, the transmission power being used to determine if the first station is to transmit and receive signals at the same respective times as the another first station or transmit and receive signals at different respective times to the another first station.

43. A method as claimed in claim 42 wherein said determined power is compared to a predetermined maximum power.

44. A method as claimed in claim 43, wherein if said predetermined power is greater than the determined power, said second station and said first station communicate.

45. A method as claimed in claim 42, wherein the method further comprises determining interference of the signals transmitted and received by the first station, said interference being used to determine if the first station is to transmit and receive signals at the same respective times as the another first station or transmit and receive signals at different respective times to the another first station.

46. A method as claimed in claim 45, wherein the determining of the interference is determining the interference between the another first station and the first station.

47. A method as claimed in claim 45, wherein the determining of the interference is determining the interference between the second station and the first station.

48. A method claimed in claim 45, wherein the method further comprises comparing the interference between the another first station and the first station with the interference between the second station and the first station.

49. A method as claimed in claim 48, wherein the method further comprises instructing the first station to transmit and receive at the same time as the another first station if the interference between the another first station and the first station is greater than the interference between the second station and the first station.

50. A method as claimed in claim 48, wherein the method further comprises instructing the first station to transmit and receive at different times to the another first station if the interference between the another first station and the first station is less than the interference between the second station and the first station.

* * * * *

UNITED STATES PATENT AND TRADEMARK OFFICE
CERTIFICATE OF CORRECTION

| | | |
|---|---|---|
| PATENT NO. | : 7,626,953 B2 | Page 1 of 1 |
| APPLICATION NO. | : 10/149797 | |
| DATED | : December 1, 2009 | |
| INVENTOR(S) | : Haas et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1744 days.

Signed and Sealed this

Second Day of November, 2010

David J. Kappos
*Director of the United States Patent and Trademark Office*